(12) United States Patent
Michelis et al.

(10) Patent No.: US 8,712,646 B2
(45) Date of Patent: Apr. 29, 2014

(54) DEVICE FOR DETERMINING THE ABSOLUTE ANGULAR POSITION OF THE STEERING WHEEL OF AN ELECTRIC POWER-ASSISTED STEERING COLUMN OF A MOTOR VEHICLE USING WEIGHTED DYNAMIC PARAMETERS OF THE VEHICLE

(75) Inventors: André Michelis, Grigny (FR); Julien Barthomeuf, Saint Genis Laval (FR); Pierre Pilaz, Saint Marcel L'eclaire (FR); Stéphane Bourbon, Saint Symphorien d'Ozon (FR)

(73) Assignee: JTEKT Europe, Irigny (FR)

( * ) Notice: Subject to any disclaimer, the term of this patent is extended or adjusted under 35 U.S.C. 154(b) by 0 days.

(21) Appl. No.: 13/512,757

(22) PCT Filed: Nov. 29, 2010

(86) PCT No.: PCT/FR2010/052554
§ 371 (c)(1),
(2), (4) Date: Oct. 4, 2012

(87) PCT Pub. No.: WO2011/067523
PCT Pub. Date: Jun. 9, 2011

(65) Prior Publication Data
US 2013/0024072 A1    Jan. 24, 2013

(30) Foreign Application Priority Data
Nov. 30, 2009   (FR) ..................... 09 58476

(51) Int. Cl.
*B62D 15/02* (2006.01)

(52) U.S. Cl.
USPC ............. 701/42; 701/36; 701/41; 73/115.07; 324/207.2; 324/207.25; 180/402; 250/231.13; 702/151

(58) Field of Classification Search
None
See application file for complete search history.

(56) References Cited

U.S. PATENT DOCUMENTS

2003/0121716 A1*  7/2003  Yamada et al. ............... 180/446
2006/0293818 A1   12/2006 Lu et al.
(Continued)

FOREIGN PATENT DOCUMENTS

DE   10 2005 053 902 A1   5/2007
DE   10 2007 021 625 A1   11/2008
(Continued)

OTHER PUBLICATIONS

Strunk Jr.. W, White. E.B. The Elements of Style. 3rd ed. New York, Macmillan Publishing Co.., Inc., 1979. pp. 40 PE1408.S772.*

(Continued)

*Primary Examiner* — Helal A Algahaim
*Assistant Examiner* — Paul Castro
(74) *Attorney, Agent, or Firm* — Oliff PLC

(57) ABSTRACT

A method for determining the absolute angular position of a steering wheel of an electric power-assisted steering column of a motor vehicle, including a means for measuring a dynamic parameter while the vehicle is running and including among others, the steps of periodically determining a multi-turn relative angular position, determining at least one dynamic parameter relating to the running conditions of the vehicle using the means for measuring said parameter, determining an absolute steering-wheel angle calculated according to at least one dynamic parameter, and weighting the calculated value of the absolute steering-wheel angle according to a test of the validity of the calculated value of the absolute steering-wheel angle and the origin of said value, in other words, the measurement means used to determine said at least one dynamic parameter.

10 Claims, 1 Drawing Sheet

(56) References Cited

U.S. PATENT DOCUMENTS

| | | | |
|---|---|---|---|
| 2008/0140340 A1 | 6/2008 | Barthomeuf et al. | |
| 2009/0125187 A1* | 5/2009 | Yamamoto et al. | 701/42 |
| 2010/0114523 A1* | 5/2010 | Waite et al. | 702/151 |
| 2010/0235052 A1* | 9/2010 | Shartle et al. | 701/41 |
| 2011/0016960 A1* | 1/2011 | Debrailly | 73/115.07 |
| 2011/0089936 A1* | 4/2011 | Putinier | 324/207.25 |

FOREIGN PATENT DOCUMENTS

| | | | |
|---|---|---|---|
| DE | 102007021625 A1 * | 11/2008 | |
| FR | 2 876 972 A1 | 4/2006 | |

OTHER PUBLICATIONS

Apr. 15, 2011 International Search Report issued in International Application No. PCT/FR2010/052554 (with translation).

Apr. 15, 2011 Written Opinion of the International Searching Authority issued in International Application No. PCT/FR2010/052554 (with translation).

* cited by examiner

DEVICE FOR DETERMINING THE ABSOLUTE ANGULAR POSITION OF THE STEERING WHEEL OF AN ELECTRIC POWER-ASSISTED STEERING COLUMN OF A MOTOR VEHICLE USING WEIGHTED DYNAMIC PARAMETERS OF THE VEHICLE

The present invention relates to a method for determining the absolute position of the steering wheel for motor vehicles equipped with an electric power-assisted steering column and comprising at least one means for measuring a dynamic parameter when the vehicle is running.

The absolute angular position information of the steering wheel is increasingly necessary in driving a vehicle, for:
the automatic return function for returning the steering wheel to the middle point,
algorithms for regulating the assistance function,
the electronic stability program (ESP),
the direction change indicators,
the additional bending lights, or cornering lights,
smart parking assistance devices (IPA, PLA).

These various applications cause several underlying issues:
the angular position information of the steering wheel must be available once the vehicle is started,
this information must be absolute and multi-turn,
the precision of this information must be high,
the accuracy of this information must be verified continuously,
the steering wheel must be able to be turned by a significant angle even when the contact is broken.

To resolve these various issues, it is known to use a dedicated absolute angular sensor situated between the steering wheel and the pinion of the steering column. This solution causes a significant excess cost on the price of the steering system.

Document FR2876972 proposes a solution not requiring a dedicated absolute angular position sensor based on:
the angular position of the rotor of the assistance engine of the electric power-assisted steering column, required for the control thereof,
the reduction ratio between the assistance motor and the steering column making it possible to define a relative position of the steering wheel,
the definition of a reference segment in the positioning of the assistance motor obtained by comparing a statistical estimate on the similarity of the speed of the rear wheels in a straight line with a mechanical estimate obtained by calculating the wheel lock angle of the vehicle,
the definition of a margin of error in the definition of the reference segment,
the definition of a shift value and deduction from an absolute angular value of the steering wheel by adjusting the zero of the relative position of the steering wheel on the reference position.

However, this method requires specific driving conditions of the vehicle to be used, in particular an equal measurement of the speed of the rear wheels that can only be done when the vehicle is driving in a straight line. The determination of the absolute position of the steering wheel using that method is therefore not possible if the vehicle is already engaged in a turn upon start-up.

Document DE 10 2007 021 625 A1 also describes a solution for initializing the wheel lock angle of the driver on a four-wheeled motor vehicle.

On the one hand, this method does away, in a manner known in particular from document FR2876972, with a dedicated position angle sensor for the steering wheel using the position angle of the rotor of the assisted steering electric motor and on the other hand uses measurements of dynamic parameters of the vehicle, such as a rate of yaw and a movement speed of the vehicle, to determine a gap between a relative wheel lock angle of the driver and a so-called absolute actual wheel lock angle of the driver.

Such a calculation of the position angle of the rotor of the electric motor is based solely on a statistical estimation of the number of occurrences done on a sector of the assistance motor.

However, this method is only implemented upon leaving the factory or after the battery of the vehicle has been disconnected, and not each time the vehicle is started.

Such a method therefore does not take into account the potential risks of error in the calculation of the absolute wheel lock angle of the driver that may occur during use of the vehicle, and places all of the dynamic parameter measurements of the vehicle on a same level of reliability irrespective of its origin.

The aim of this invention is to resolve all or some of the drawbacks mentioned above, in particular by providing a method whereof the initialization is not restricted to particular driving conditions of the vehicle and the implementation of which considers the risks of errors related to the measurements of the dynamic parameters.

To that end, the present invention relates to a method for determining the absolute angular position of a steering wheel of an electric power-assisted steering column of a motor vehicle, comprising at least one means for measuring a dynamic parameter while the vehicle is running, the power-assisted steering system comprising:
an electric assistance motor steered by an electronic computer and comprising a rotor performing a number of turns ($N_{turns\_elec}$) during the rotation of the steering wheel,
a reduction gear at the output of the gear reduction ($\Gamma$) electric motor,
an angular position sensor of the rotor of the motor, of the "resolver" type and measuring a single-turn absolute position ($\theta_{mono\text{-}elec}$) depending on a number of pairs of poles (n) distributed between the angular sensor and the rotor of the motor, and
a torque sensor making it possible to determine the torque exerted on the steering wheel by the driver,
the method being characterized in that it comprises the following steps:
initializing, at 0, the number of turns ($N_{turns\_elec}$) of the rotor of the electric motor when the vehicle is started,
periodically determining a multi-turn relative angular position of the steering wheel, in particular using the formula:

$$\theta_{relative\ steering\ wheel} = \frac{\theta_{mono\ elec} \times N_{turns\text{-}elec}}{\Gamma \times n}$$

determining at least one dynamic parameter relating to the running conditions of the vehicle using the at least one means for measuring that parameter,
determining internal data of the electric power-assisted steering column such as the engine speed and the steering lock torque, which is equal to the sum of the steering torque of the motor and the torque exerted by the driver, determining an absolute steering wheel angle calculated according to at least one dynamic parameter on the dynamic running conditions of the vehicle, checking the validity of the calculated value of the absolute steering wheel angle as a function of the dynamic running conditions of the vehicle in which it has been determined as well as internal data of the electric power-assisted steering column, weighting the calculated value of the absolute steering wheel angle according to a test of the validity of the calculated value of the absolute steering wheel angle, and the origin of said value, i.e. the measurement means used to determine said at least one dynamic parameter, determining a recalibration authorization value for the absolute position of the steering wheel, and recalibrating the position of the steering wheel on the recalibration authorization value.

This method is satisfactory in that it is initiated each time the vehicle is started, and it is not necessary to place the vehicle under particular dynamic running conditions, in particular in terms of stability, this determination no longer being based on a statistical estimation of the number of occurrences on a sector of the assistance engine, but on a weighting of the value of that angle as a function of the source of the values calculated from the dynamic running conditions. The analysis of the data relative to the dynamic running conditions of the vehicle and the wheel lock torque (assistance torque+driver torque) makes it possible to determine a multi-turn absolute angular position of the steering wheel continuously, as of when the vehicle is started. Furthermore, the precision of the recalibration is even better inasmuch as the "resolver" provides a reliable and precise position of the relative position of the steering wheel, which is the case since the shaft of the engine and the steering column are mechanically connected by the reducer of the electric power-assisted steering column whereof the reduction ratio can be seen as a multiplier of the precision of the travel of the steering wheel.

According to the same operating mode, the recalibration step for the position of the steering wheel takes place if predetermined dynamic conditions of the vehicle are met.

This arrangement makes it possible to obtain a reliable value of the absolute angular position of the steering wheel inasmuch as certain dynamic running conditions prevent having a satisfactory precision of that absolute angular position.

In the case of the preceding operating mode, the predetermined dynamic conditions concern a given vehicle speed threshold.

The speed of the vehicle directly influences certain dynamic running parameters such as the speed of the wheels and the rate of yaw in a turn, which are given by two means for measuring dynamic data of the vehicle, which also contributes redundancy to the information that may be taken into account in weighting the calculated value of the absolute steering wheel angle.

In the case of the preceding operating mode, the recalibration occurs if the predetermined dynamic conditions of the vehicle are respected for a predetermined length of time.

This arrangement results in improving the precision and validity of the calculated value of the absolute steering wheel angle.

According to one operating mode, the method includes a correction step in the determination of at least one dynamic parameter of the vehicle in case of a wheel with a different diameter from the others or a deflated tire.

This arrangement provides for the case where the values returned by the measuring means are distorted due to a deflated tire or running with a spare tire having a different diameter from the other wheels and provides for an adjustment, if necessary, by wheel speed correction coefficients.

According to one operating mode, the means for measuring a dynamic parameter of the vehicle includes an anti-lock brake system (ABS) making it possible to determine the speed of the wheels using sensors positioned on each of the wheels.

This arrangement makes it possible to take advantage of equipment preexisting on the vehicle to determine the speed of the wheels and thereby calculate the absolute angle of the steering wheel while doing away with a sensor dedicated to measuring these wheel speeds.

In the case of the preceding operating mode, the sensors positioned on each of the wheels send signals to an ABS computer that processes those signals in order to deduce the speed of each of the wheels therefrom, then which periodically makes them available on a CAN (Controller Area Network) of the vehicle.

This arrangement allows the set of computers of the vehicle to have access to the information on the speed of the wheels of the vehicle.

According to one operating mode, the means for measuring a dynamic parameter of the vehicle includes an electronic stability program (ESP) making it possible to determine the rate of yaw and/or the lateral acceleration of the vehicle.

This arrangement makes it possible to calculate an absolute angle of the steering wheel from dynamic parameters of rate of yaw and/or lateral acceleration of the vehicle.

According to the same operating mode, an ESP computer periodically provides, on a CAN (Controller Area Network) of the vehicle, the values of the rate of yaw and/or the lateral acceleration of the vehicle.

This arrangement allows all of the computers of the vehicle to have access to the information on the rate of yaw and the lateral acceleration of the vehicle.

According to one operating mode, the electronic computer of the electric power-assisted steering column receives information on the speed of the wheels and/or on the rate of yaw and/or on the lateral acceleration of the vehicle on a CAN of the vehicle.

This arrangement allows the onboard electronic computer of the electric power-assisted steering column to recover data on the dynamic behavior of the vehicle, for example provided by the ABS computer and/or by the ESP computer.

In any case, the invention will be better understood using the following description, in reference to the appended diagrammatic drawing, shown, as examples for some, one embodiment of the method according to the invention.

Figure 1:
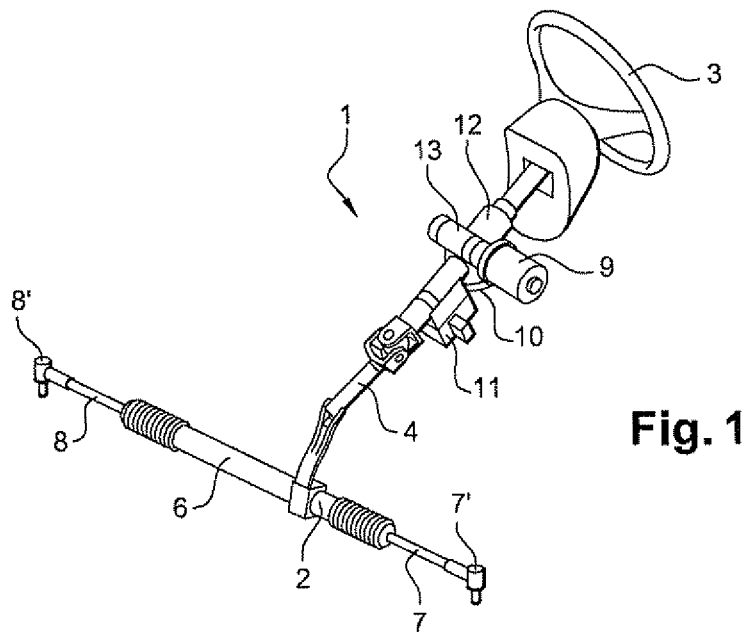
FIG. 1 is a diagrammatic perspective view of an electric power-assisted steering column of the state of the art.
Figure 2:
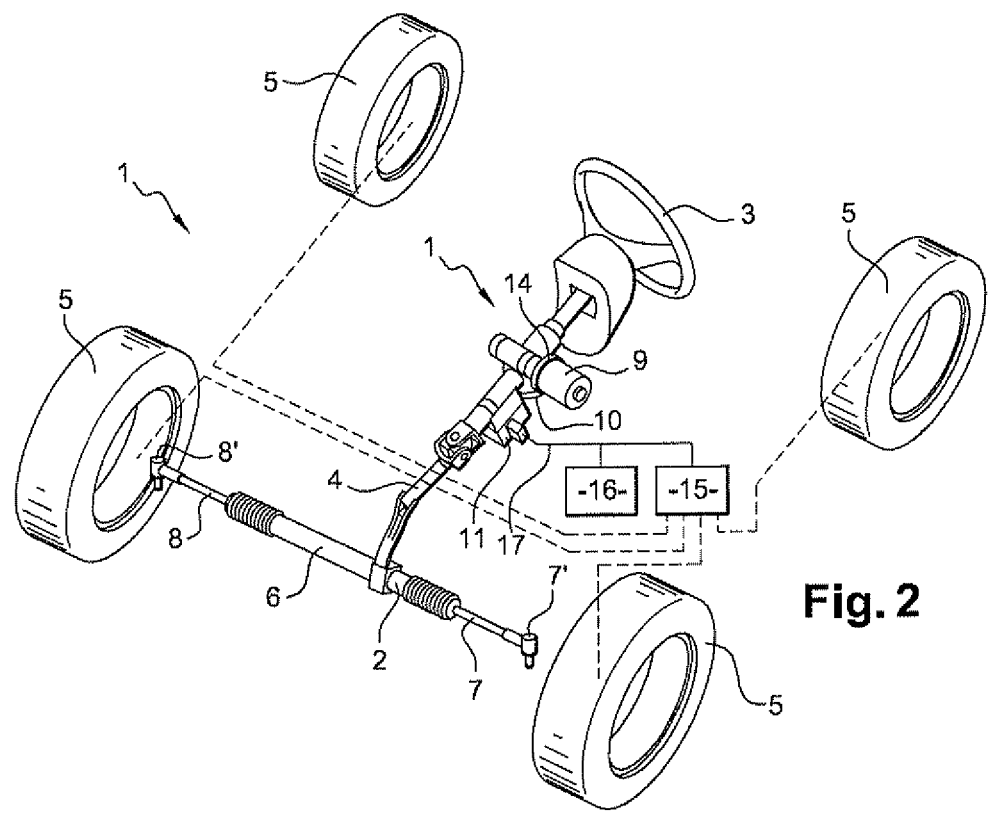
FIG. 2 is a diagrammatic perspective view illustrating the implementation of the method according to the invention in a vehicle.

FIG. 1 recalls the main elements making up an electric power-assisted steering column 1 of a motor vehicle.

Such a steering column 1 includes, on the one hand, a mechanical portion generally designated by reference 2, including a steering wheel 3 connected to a steering column 4, whereof the end remote from the steering wheel 3 supports a steering pinion engaged with a rack (not visible), slidingly mounted in a steering gearbox 6. The two opposite ends of the rack are respectively connected, via left 7 and right 8 connecting rods respectively equipped at the outer end thereof with a left 7' and right 8' steering ball joint, to the hub carriers (not shown) of the left and right steering wheels of the concerned motor vehicle.

The electric power-assisted steering column 1 includes, to assist the manual effort exerted by the driver of the vehicle on the steering wheel 3, an electric assistance motor 9 with two directions of rotation, the output shaft of which is coupled, via a reduction gear 10 in particular with a worm and tangent wheel, to the steering column 4, so as to transmit an engine torque (possibly also a resisting torque) to the steering column 4.

The electric assistance motor 9 is steered by an onboard electronic computer 11 connected to a CAN 17 (Controller Area Network) of the vehicle allowing it to receive and process various signals coming from various sensors controlling various parameters of the vehicle's behavior.

In one embodiment according to the state of the art, the electronic computer 11 receives an electric signal from a dedicated sensor 12 informing it on the relative, absolute or multi-turn absolute wheel lock angle of the steering wheel 3, representative of the actual instantaneous wheel lock angle of the concerned motor vehicle.

This computer 11 also receives a signal coming from a torque sensor 13 placed on the steering column 4, and thereby measuring the torque exerted by the driver on the steering wheel 3.

From these different pieces of information, the computer 11 steers the electric assistance motor 9, by imposing, at all times, internal data from the electric power-assisted steering column 1 such as a torque or an assistance force of the motor 9, which can amplify or offset the force applied by the driver on the steering wheel 3, according to predefined "assistance laws" programmed into a non-volatile memory of the computer 11.

In an electric power-assisted steering column used with the method according to the invention, the dedicated sensor 12 is eliminated and the information from an angular sensor 14 of the electric power-assisted steering column 1 is used of the "resolver" type dedicated to detecting the absolute angular position θ of the electric assistance motor 9 between two successive poles among n stator poles of said assistance motor 9, with $$0 < \theta < \frac{360}{n}$$

In counting the number of turns of the rotor of the motor 9, by detecting the passage by 0° upon each sampling, it is possible to calculate a multi-turn relative position of the rotor of the motor 9 using the formula:

$$\theta_{multi\_elec} = \theta_{mono\_elec} \times N_{turns\_elec}$$

with the variable $N_{turns\_elect}$ that is incremented upon each passage from 359° to 0°, or decremented upon each passage from 0° to 359°.

The multi-turn relative position of the rotor of the motor 9 is obtained using the following formulas:

$$\theta_{multi\_rotor} = \frac{\theta_{multi\_elec}}{n}$$

$$\theta_{multi\_rotor} = \frac{\theta_{mono\_elec} \times N_{turns\_elec}}{n}$$

The steering column 4 is rotated by the motor 9, via the gear reducer 10, and the position of the steering wheel 3 relative to the motor 9 is given by the following formula:

$$\theta_{relative\_steering\_wheel} = \frac{\theta_{multi\_rotor}}{\Gamma}$$

The multi-turn relative position of the steering wheel 3 as a function of the single-turn absolute position of the motor 9 is ultimately determined from the following formula:

$$\theta_{relative\_steering\_wheel} = \frac{\theta_{mono\_elec} \times N_{turns\_elec}}{\Gamma \times n}$$

When the vehicle is started, the number of turns $N_{turns\_elec}$ is initialized at 0. The relative position uses 0° as its initial value, and may never be greater than the maximum travel of the steering wheel 3 from stop to stop.

The angular position of the steering wheel 3 determined from the angular position of the assistance motor 9 makes it possible to obtain a relative position with a high level of precision and resolution.

This process can be applied irrespective of the electric assistance system on a column, pinion, or rack. Inasmuch as the steering wheel is mechanically connected to the system, it is always possible to determine its position, taking intermediate mechanical elements (reduction gears, torsion bars) into account.

This process can also be applied on steering systems in which the function connecting the position of the steering wheel and the position of the pinion is not linear.

In fact, the calculated position will reflect the position of the pinion, yet it is that position that determines the wheel lock of the front wheels, and the direction of the vehicle. It is therefore the direction of the pinion that interests the equipment.

According to the invention, the implementation of the method for determining the absolute angular position of the steering wheel of an electric power-assisted steering column of a motor vehicle uses at least one measuring means providing the value of a dynamic parameter of the vehicle during running thereof.

This measuring means includes the computer 15 of the antilock brake system (ABS) making it possible to determine the speed of the wheels 5 using sensors positioned on each of the wheels 5 and/or the computer 16 of the electronic stability program (ESP) making it possible to determine the rate of yaw and/or the lateral acceleration of the vehicle.

In the determination of an absolute position of the steering wheel 3 by analyzing the wheel speeds 5 provided by the ABS computer 15, the algorithm used by the computer 11 generally uses the speed deviations between the left and right wheels 5.

This algorithm is specified here as an example using the speed of the rear wheels, but it would also be possible to use the speed of the front wheels, or all four wheels 5.

The average speed of the rear wheels is obtained using the following formula:

$$V_{rear\ wheel\ average} = \frac{V_{rear\ left\ wheel} + V_{rear\ right\ wheel}}{2}$$

The speed deviation E of the rear wheels is written:

$$E_{rear\ speed} = V_{rear\ left\ wheel} - V_{rear\ right\ wheel}$$

The instantaneous sign of the direction is given by the sign of the speed deviation of the rear wheels, and conventionally, this sign is positive when the steering wheel is turned to the right and this sign is negative when the steering wheel is turned to the left.

Knowing the constant value of the rear path of the vehicle, the instantaneous radius R of the path of the vehicle is calculated from the following formula:

$$R = \frac{V_{rear\ wheel\ average}}{E_{rear\ speeds}} \times Path_{rear}$$

The radius R being determined, and knowing the wheel base L of the vehicle, the Ackerman angle corresponding to the average wheel lock angle of the steering wheels is calculated using the following formula:

$$\alpha_{Ackerman} = \frac{L}{R}$$

The lateral acceleration $Y_{lateral}$ of the vehicle, estimated from the instantaneous radius and the average speed of the vehicle, makes it possible to calculate the average drift angle α of the tires:

$$Y_{lateral} = \frac{(V_{rear\ left\ average})^2}{R}$$

$$\alpha_{drift} = K(R) \times Y_{lateral}$$

The relationship between the understeering gradient K and the wheel lock radius R is specific to each type of vehicle. This relationship is completed in the form of an abacus stored in non-volatile memory in the computer 11.

The average drift angle is corrected by a corrective gain G depending on the characteristic lateral acceleration of the vehicle:

$$\alpha_{drift} = G_{corrective} \times \alpha_{theoretical\_drift}$$

The average wheel lock angle of the steering wheels is equal to the sum of the Ackerman angle and the average drift angle of the tires:

$$\alpha_{steering\ wheels} = \alpha_{Ackerman} + \alpha_{rear}$$

A relationship exists between the absolute angular position of the steering wheel and the wheel lock angle of the steering wheels, characteristic of each type of vehicle. This relationship is completed in the form of an abacus stored in non-volatile memory in the computer.

$$\theta_{steering\ wheel\ absolute} = f(\alpha_{wheels})$$

This same relationship can be obtained from information provided to the computer 11 by the ESP computer 16 from the rate of yaw or the lateral acceleration of the vehicle.

To that end, the instantaneous radius of the path of a vehicle traveling at a speed V can be calculated from the rate of yaw PSI' of the vehicle using the formula:

$$R = \frac{V_{Vehicle}}{PSI'}$$

and/or from the lateral acceleration $\Box_{lateral}$ of the vehicle using the formula:

$$R = \frac{(V_{Vechicle})^2}{V_{lateral}}$$

These two computers 15, 16 periodically provide information on the speed of the wheels 5, rate of yaw, and lateral acceleration on the CAN 17 of the vehicle connected to the computer 11 of the electric power-assisted steering column 1.

To determine the absolute position of the steering wheel 3 from the speed of the wheels 5, the method provides for correcting the wheel 5 speeds in case of running with a spare tire having a different diameter from the other wheels 5 or in case of running with a deflated tire.

This correction function checks the speed deviations of the wheels 5 over long distances, and if necessary, adjusts the speed correction coefficients of the wheels 5.

The variables used by this function are saved in non-volatile memory, so as to be able to calculate the total of the deviations over several kilometers, independently of any stops of the vehicle during the calculation.

After collecting a dynamic running parameter, the computer 11 checks the validity of the calculated value of the absolute steering wheel angle as a function on the one hand of the dynamic running conditions of the vehicle under which said dynamic parameter was determined, and on the other hand as a function of the internal data of the electric power-assisted steering column 1 such as the assistance torque or the speed of the engine.

To that end, the computer 11 weights each of these values as a function of predetermined rules established on the dynamic running conditions, for example sufficient running time, a given vehicle speed threshold, but also the source of these values depending on whether they were determined by measuring the speed of the wheels 5 done by the ABS computer 15 or by measuring the rate of yaw and/or the lateral acceleration done by the ESP computer 16.

Regarding this source of the calculated values of the absolute steering wheel angle, it is possible to introduce a score notion that can be interpreted as a confidence indicator on the precision of the theoretical calculation of the absolute angle.

The score results from the compilation of different score tables having various inputs mixing the dynamic conditions of the vehicle and the internal data of the electric power-assisted steering column 1.

Recovering all of the weighted values makes it possible to calculate an instantaneous shift of the relative angle corresponding to the difference between the relative angle calculated from the measurement of the "resolver" 14 on the rotor of the assistance motor 9 and the absolute angle calculations determined from dynamic running parameters coming from the ABS computer 15 and/or the ESP computer 16.

In order to average this instantaneous shift information, the computer 11 calculates the average of the shift using a cumulative average weighted by the instantaneous score.

Calculating and storing the deviation between the relative position and the absolute position when predetermined conditions are met therefore makes it possible to precisely determine the multi-turn absolute position of the steering wheel at all times.

The computer 11 of the electric power-assisted steering column 1 periodically provides absolute position information of the steering wheel on the CAN 17, as well as the validity of that information.

The invention is of course not limited solely to the embodiment described above as an example; on the contrary, it encompasses all alternative embodiments of that method.

Thus, in particular, it is not beyond the scope of the invention for all of the data collected, calculated and transmitted by the computer 11 of the electric power-assisted steering column to be collected, calculated and transmitted by another dedicated computer.

The invention claimed is:

1. A method for determining the absolute angular position of a steering wheel of an electric power-assisted steering column of a motor vehicle, comprising at least one means for measuring a dynamic parameter while the vehicle is running, the power-assisted steering column of the motor vehicle comprising:
    an electric assistance motor steered by an electronic computer and comprising a rotor performing a number of turns ($N_{turns\_elec}$) during the rotation of the steering wheel,
    a reduction gear at the output of the gear reduction ($\Gamma$) electric motor,
    an angular position sensor of the rotor of the motor, of the "resolver" type and measuring a single-turn absolute position ($\theta_{mono\text{-}elec}$) depending on a number of pairs of poles (n) distributed between the angular sensor and the rotor of the motor, and
    a torque sensor making it possible to determine the torque exerted on the steering wheel by the driver,
    the method being characterized in that it comprises the following steps:
    initializing, at 0, the number of turns ($N_{turns\_elec}$) of the rotor of the electric motor when the vehicle is started,
    periodically determining a multi-turn relative angular position of the steering wheel, in particular using the formula:

$$\theta_{relative\ steering\ wheel} = \frac{\theta_{mono\ elec} \times N_{turns\text{-}elec}}{\Gamma \times n}$$

determining at least one dynamic parameter relating to the running conditions of the vehicle using the at least one means for measuring that parameter,
    determining internal data of the electric power-assisted steering column comprising the engine speed and the steering lock torque, which is equal to the sum of the steering torque of the motor and the torque exerted by the driver,
    determining an absolute steering wheel angle calculated according to the at least one dynamic parameter on the dynamic running conditions of the vehicle,
    checking the validity of the calculated value of the absolute steering wheel angle as a function of the dynamic running conditions of the vehicle in which it has been determined as well as internal data of the electric power-assisted steering column,
    weighting the calculated value of the absolute steering wheel angle according to a test of the validity of the calculated value of the absolute steering wheel angle, and the origin of said value, i.e. the measurement means used to determine said at least one dynamic parameter,
    determining a recalibration authorization value for the absolute position of the steering wheel, and
    recalibrating the position of the steering wheel on the recalibration authorization value.

2. The method according to claim 1, wherein the recalibration step for the position of the steering wheel takes place if predetermined dynamic conditions of the vehicle are met.

3. The method according to claim 2, wherein the predetermined dynamic conditions concern a given vehicle speed threshold.

4. The method according to claim wherein the recalibration occurs if the predetermined dynamic conditions of the vehicle are respected for a predetermined length of time.

5. The method according to claim 1, including a correction step in the determination of at least one dynamic parameter of the vehicle in case of a wheel with a different diameter from the others or a deflated tire.

6. The method according to claim 1, wherein the means for measuring a dynamic parameter of the vehicle includes an anti-lock brake system (ABS) making it possible to determine the speed of the wheels using sensors positioned on each of the wheels.

7. The method according to claim 6, wherein the sensors positioned on each of the wheels send signals to an ABS computer that processes those signals in order to deduce the speed of each of the wheels therefrom, then which periodically makes them available on a CAN of the vehicle.

8. The method according to claim 1, wherein the means for measuring a dynamic parameter of the vehicle includes an electronic stability program (ESP) making it possible to determine the rate of yaw or the lateral acceleration of the vehicle.

9. The method according to claim 8, wherein an ESP computer periodically provides, on a CAN of the vehicle, the values of the rate of yaw or the lateral acceleration of the vehicle.

10. The method according to claim 1, wherein the electronic computer of the electric power-assisted steering column receives information on the speed of the wheels on the rate of yaw or on the lateral acceleration of the vehicle on a CAN of the vehicle.

* * * * *